UNITED STATES PATENT OFFICE.

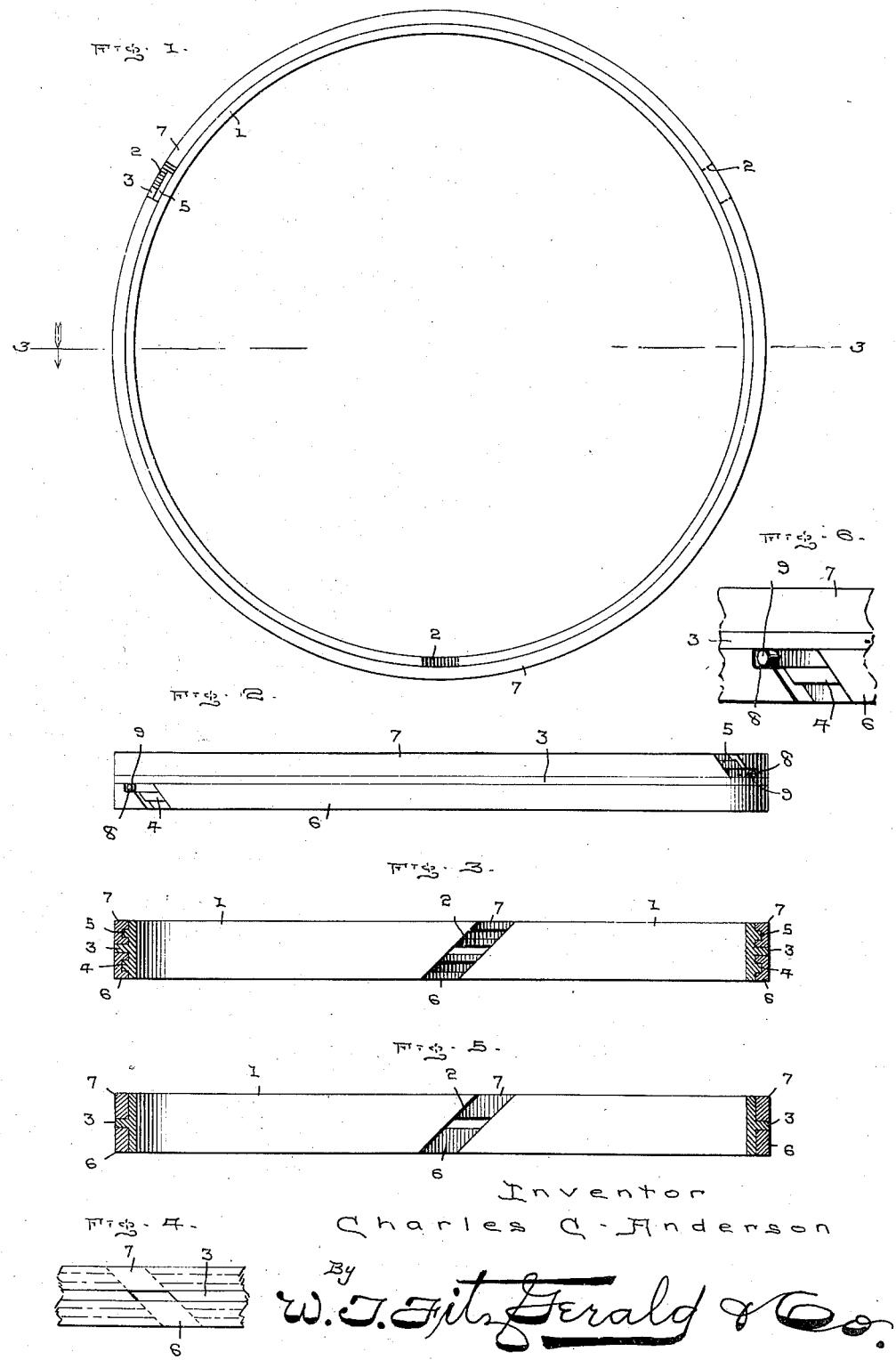
C. C. ANDERSON.
METALLIC PACKING.
APPLICATION FILED FEB. 17, 1917.
1,320,307.
Patented Oct. 28, 1919.

CHARLES C. ANDERSON, OF FAIRFIELD, IOWA.

METALLIC PACKING.

1,320,307.　　　　Specification of Letters Patent.　　　Patented Oct. 28, 1919.

Application filed February 17, 1917. Serial No. 149,310.

*To all whom it may concern:*

Be it known that I, CHARLES C. ANDERSON, a citizen of the United States, residing at Fairfield, in the county of Jefferson and State of Iowa, have invented certain new and useful Improvements in Metallic Packings; and I do hereby declare the following to be a full, clear, and exact description of the invention, such as will enable others skilled in the art to which it appertains to make and use the same.

My invention relates to metallic packing and particularly to a reliable and efficient form of metallic packing designed for steam and internal combustion engines and for similar purposes and my prime object consists in providing a metallic packing ring which may be used singly or as grouped with other similar rings, though ordinarily one of my packing rings will be found amply sufficient to prevent all leakage of gas or compression.

In almost all other cases it is necessary to use a plurality of packing rings, but I desire to call particular attention to the fact that ordinarily one of my packing rings will be found to meet all requirements in guarding against lost compression in any form of engine or pump.

It will be observed that I have grouped together three separate parts in forming my metallic packing ring and that all of said parts are disposed in bearing contact with the inner surface of the cylinder.

It will be further observed that the openings in my three assembled rings are disposed and held at such points that the said openings will be substantially at 120 deg. in the theoretical circle thereby insuring uniformity of wear and a perfect seal against the escape of gas, steam or other substance controlled.

In the accompanying drawings which are made a part of this application,

Figure 1 shows a plan view of my metallic packing ring ready for the parts thereof to be compressed sufficiently to enter the bore of the cylinder.

Fig. 2 is an edge view of my packing ring.

Fig. 3 is a central sectional view as indicated on dotted lines in Fig. 1.

Fig. 4 is a detail view showing a portion of my packing ring and indicating certain parts thereof in dotted lines. Fig. 5 is a section and Fig. 6 is a detail view. For convenience of reference to the various details of my invention, numerals will be employed the same numeral applying to the corresponding part in the several views.

Briefly stated, my packing ring consists of three separate parts, which are so interfitted with each other as to form a complete unitary structure comprising my metallic packing ring.

Referring in detail to the drawings, 1 indicates the body portion of my metallic packing ring which is severed at one point as indicated by the numeral 2 and is provided upon its exterior face with a central longitudinal rib 3 and with ribs of lesser size 4 and 5 on either side of the rib 3 and parallel therewith for a purpose hereinafter set forth.

Upon each side of the centrally disposed rib 3, I dispose the bearing rings 6 and 7. Each of the rings 6 and 7 is provided on its inner face with a groove of proper size to snugly receive one of the ribs 4 and 5 as the case may be, while said rings 6 and 7 are of sufficient thickness to insure that their outer surfaces will be flush with the outer face of the rib 3 whereby said rings and said rib will be in close bearing contact with the inner surface of the cylinder and will therefore wear uniformly.

Each of the rings 6 and 7 is severed at a proper point thereof so that said points of severance and the severance 2 of the body portion 1 will when operatively assembled lie relatively at a point in the circle of 120 deg. from each other.

In order to reliably control or limit the position of these points of severance, it will be seen that a recess 8 is formed at the point of severance of each ring 6 and 7 whereby said recess 8 will receive the small pin or stud 9 whereby the position of the said rings will be relatively determined with regard to the point of severance on the body portion 1 as will be clearly obvious.

Inasmuch as the ribs 4 and 5 are of much lesser extent than the central rib 3 their office is to reliably seat and hold the rings 6 and 7 inasmuch as said ribs 4 and 5 fit snugly within suitable grooves provided on the inner face of said rings as hereinbefore stated.

I desire to call particular attention, therefore, to the fact that I have provided points of severance of the component parts of my metallic packing ring in such a manner that said points of severance will be equi-distant from each other in the circle described by them and the possibility of any leakage of gas, etc., is, therefore, reduced to a minimum or wholly eliminated. By means of the studs 9 and the recesses 8, the meeting ends of the rings can be brought tightly together as will be clearly obvious by reference to the drawings.

I desire to call attention also to the fact that all three of the component parts of my metallic packing ring are at all times in bearing contact with the inner surface of the cylinder insuring that the wear upon the cylinder will be within a complete circle whereas by the use of many contacting rings the cylinder is worn not in a true circle but into an oval or more upon one side than another.

It will be observed that the body portion 1 in cross section is somewhat T-shaped which gives an extra bearing surface when combined with the auxiliary rings 6 and 7 as before stated, while the rib 3 is always flush with the outer surface of said rings and will, therefore, insure that said parts will wear uniformly and truly.

Believing that the advantages, construction and manner of using my invention, have thus been made clearly apparent from the foregoing specification considered in connection with the accompanying drawings, further description is deemed unnecessary.

What I claim and desire to secure by Letters Patent, is:—

A piston packing ring consisting of a resilient split major ring, a comparatively large reinforcing rib extending around the outer circumference of the major ring and positioned intermediate its side edges to contact with the cylinder walls, a smaller reinforcing rib extending around the outer circumference of the major ring and positioned intermediate said larger reinforcing rib and each side edge of the major ring flush with said edge, all of said ribs projecting laterally in parallel relation from the major ring and each being rectangular in cross section, a resilient split bearing ring rectangular in cross section and encircling said resilient major ring on each side of said larger reinforcing rib and provided in its inner circumference with a groove rectangular in cross section to receive one of said smaller reinforcing ribs to hold it in position on the major ring, said larger reinforcing rib and the bearing rings on opposite sides thereof being flush and providing a three point resilient contact with the cylinder wall, and means to prevent relative movement of said rings.

In testimony whereof I have signed my name to this specification in the presence of two subscribing witnesses.

CHARLES C. ANDERSON.

Witnesses:
CARL DANIELSON,
W. H. GUYER.